(12) United States Patent
Dam et al.

(10) Patent No.: US 12,331,933 B2
(45) Date of Patent: Jun. 17, 2025

(54) MULTIPHASE FUEL INJECTOR

(71) Applicants: Bidhan Dam, Zeeland, MI (US);
Mowgli Crosby, Zeeland, MI (US);
Sudipa Sarker, Zeeland, MI (US)

(72) Inventors: Bidhan Dam, Zeeland, MI (US);
Mowgli Crosby, Zeeland, MI (US);
Sudipa Sarker, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/170,932

(22) Filed: Feb. 17, 2023

(65) Prior Publication Data

US 2024/0085025 A1 Mar. 14, 2024

Related U.S. Application Data

(60) Provisional application No. 63/311,825, filed on Feb. 18, 2022.

(51) Int. Cl.
*F23R 3/34* (2006.01)
*F02C 7/232* (2006.01)
(Continued)

(52) U.S. Cl.
CPC .............. *F23R 3/346* (2013.01); *F02C 7/232* (2013.01); *F16K 17/04* (2013.01); *F16K 21/04* (2013.01);
(Continued)

(58) Field of Classification Search
CPC .......... F02C 7/232; F16K 17/04; F16K 21/00; F16K 21/04; F23D 11/24; F23D 11/26; F23D 11/383; F23D 2900/11002; F23K 5/147; F23K 2300/206; F23K 2900/05001; F23N 1/007; F23N 2241/20; F23N 2235/12; F23N 2235/16; F23N 2235/24;
(Continued)

(56) References Cited

U.S. PATENT DOCUMENTS 8,800,895 B2 8/2014 Hicks et al.
9,683,739 B2 6/2017 Hicks
(Continued)

FOREIGN PATENT DOCUMENTS

EP 2385299 A2 11/2011
GB 681322 A 10/1952

*Primary Examiner* — Scott J Walthour
(74) *Attorney, Agent, or Firm* — Reinhart Boerner Van Deuren P.C.

(57) ABSTRACT

A multiphase fuel injector has an injector body with a fuel inlet at a first end and a fuel outlet at a second end opposite the first end. A primary circuit disposed proximate the fuel inlet extends into a central portion of the injector body. The primary circuit is configured to receive a first flow of pressurized fuel from the fuel inlet that discharges into a spin chamber in the injector body downstream from the fuel inlet. The primary circuit is configured to impart a swirling action to the first flow of pressurized fuel. A secondary circuit is located in the injector body radially outward from the primary circuit. The secondary circuit is configured to receive a second flow of pressurized fuel from the fuel inlet that discharges into the fuel outlet. The secondary circuit is configured to impart a swirling action to the second flow of pressurized fuel.

11 Claims, 4 Drawing Sheets

(51) Int. Cl.
  *F16K 17/04* (2006.01)
  *F16K 21/04* (2006.01)
  *F23R 3/16* (2006.01)
  *F23R 3/28* (2006.01)

(52) U.S. Cl.
  CPC ............... *F23R 3/16* (2013.01); *F23R 3/283* (2013.01); *F23R 3/343* (2013.01)

(58) Field of Classification Search
  CPC .... F23N 2235/26; F23N 2235/28; F23R 3/16; F23R 3/283; F23R 3/343; F23R 3/346
  See application file for complete search history.

(56) References Cited

U.S. PATENT DOCUMENTS

| | | |
|---|---|---|
| 9,765,972 B2 | 9/2017 | Zink |
| 11,149,950 B2 | 10/2021 | Niemeyer et al. |
| 2010/0037615 A1* | 2/2010 | Williams ................ F02C 7/232 |
| | | 137/538 |
| 2012/0138710 A1 | 6/2012 | Hicks et al. |
| 2015/0007572 A1* | 1/2015 | Pousseo ................ F02C 7/232 |
| | | 60/740 |

\* cited by examiner

MULTIPHASE FUEL INJECTOR

CROSS-REFERENCE TO RELATED APPLICATIONS

This patent application claims the benefit of U.S. Provisional Patent Application No. 63/311,825, filed Feb. 18, 2022, the entire teachings and disclosure of which are incorporated herein by reference thereto.

FIELD OF THE INVENTION

This invention generally relates to fuel delivery systems, and, more particularly, to fuel injectors for delivering fuel to a combustion chamber.

BACKGROUND OF THE INVENTION

Variable-area fuel injectors have been used in many applications relating to air-breathing propulsion systems, including in ramjets, scramjets, and in gas turbine engines such as those used in aviation. Ramjets, scramjets, and gas turbine engines typically include a section for compressing inlet air, a combustion section for combusting the compressed air with fuel, and an expansion section where the energy from the hot gas produced by combustion of the fuel is converted into mechanical energy. The exhaust gas from the expansion section may be used to achieve thrust or as a source of heat and energy.

Generally, one or more types of fuel injectors are used in the combustion section for spraying a flow of fuel droplets or atomized fuel into the compressed air to facilitate combustion. In some applications of air-breathing propulsion systems including ramjets, scramjets, and particularly in gas turbine engines, which must run at variable speeds, variable-area fuel injectors have been used because they provide an inexpensive method to inject fuel into a combustor, while also metering the fuel flow without the need for an additional metering valve.

Typically, the fuel flow rate is controlled by the combination of a spring, the fuel pressure, and an annular area, which is increasingly enlarged as the fuel pressure is increased. This is unlike the operation of pressure-swirl atomizers where the pressure-flow characteristics are static, and are determined solely by the fixed injector geometry and the variable injection pressure. Generally, variable-area fuel injectors provide good atomization over a much wider range of flow rates than do most pressure-swirl atomizers. Additionally, with variable-area fuel injectors, the fuel pressure drop is taken at the fuel injection location, thus providing better atomization than typical pressure-swirl and plain-orifice atomizers.

However, throughout its operational pressure range, most variable-area fuel injectors do not provide optimal spray circumferential uniformity, or patternation. Typically, these conventional variable-area fuel injectors have slots or holes used to feed fuel to the fuel manifold which is upstream of the exit area. In general, this configuration does not prevent the formation of wakes in the fuel flow downstream of these slots or holes. Optimal patternation is desirable in order to avoid non-uniform fuel distribution, which can cause hot spots in air-breathing engines resulting in thermal distress and failure of the engine itself. Good patternation also helps avoid regions of high fuel concentration (i.e., rich regions) in combustors, which reduces fuel efficiency and leads to poor emissions quality.

In applications not related to air-breathing engines, poor patternation can also lead to failure of the device. One such application is the automotive engine exhaust treatment process in which fuel is used to increase the temperature of the engine exhaust. By increasing the temperature of the exhaust, downstream post-engine exhaust treatment devices, such as dosers and diesel particulate filters can operate more effectively. However, poor patternation can cause hot-spots in the matrix of both the doser and the diesel particulate filter, thus reducing the life of the matrix. Fuel injectors may also be used in missile applications, which typically requires higher fuel turndown ratio to meet flight envelope. The fuel turndown ratio is defined as the ratio of the maximum fuel input rate to the minimum fuel input rate.

A fuel injector apparatus is disclosed in U.S. Pat. No. 8,800,895 entitled, "Piloted Variable Area Fuel Injector, and in U.S. Pat. No. 9,683,739 entitled, "Variable-Area Fuel Injector With Improved Circumferential Spray Uniformity," while U.S. Pat. No. 11,149,950 discloses a Pre-Swirl Pressure Atomizing Tip for a nozzle of a fuel injector, and U.S. Patent Pub. No. 2012/0138710 discloses a Hybrid Variable Area Fuel Injector with Thermal Protection, the entire teachings and disclosures of which area incorporated herein by reference thereto.

In one aspect, embodiments of the invention provide a multiphase fuel injector that includes an injector body having a fuel inlet at a first end of the injector body and a fuel outlet at a second end of the injector body opposite the first end. A primary circuit is disposed proximate the fuel inlet and extends into a central portion of the injector body. The primary circuit is configured to receive a first flow of pressurized fuel from the fuel inlet and discharge the fuel into a spin chamber located in the injector body downstream from the fuel inlet. The primary circuit is configured to impart a swirling action to the first flow of pressurized fuel. A secondary circuit is located in the injector body radially outward from the primary circuit. The secondary circuit is configured to receive a second flow of pressurized fuel from the fuel inlet and discharge the fuel into the fuel outlet. The secondary circuit is configured to impart a swirling action to the second flow of pressurized fuel.

In a particular embodiment, the primary circuit includes a flow plate attached to a biasing spring, wherein the flow plate blocks fuel from flowing into the secondary circuit when the biasing spring is fully extended, and allows fuel to flow into the secondary circuit when the biasing spring is compressed. In a more particular embodiment, the biasing spring is configured such that the primary circuit facilitates ignition of fuel at a flow rate of less than 50 pounds per hour (PPH). In another embodiment, the biasing spring is configured such that the primary and secondary circuits together facilitate a maximum fuel flow rate greater than 6,000 pounds per hour (PPH).

In certain embodiments, the primary circuit includes one or more helical primary openings formed in the injector body. The one or more helical primary openings are configured to direct the first flow of pressurized fuel in the primary circuit to the spin chamber and to impart a swirling motion to the first flow of pressurized fuel. The secondary circuit may include one or more helical secondary openings formed in the injector body. The one or more helical secondary openings are configured to direct the second flow of pressurized fuel to the fuel outlet and to impart a swirling motion to the second flow of pressurized fuel. In some embodiments, the secondary circuit includes one or more helical secondary openings are located radially outward from the one or more helical primary openings. In an alternate embodiment, the primary circuit includes a fuel swirler inserted into an opening in the injector body, the fuel swirler having one or more helical grooves in an exterior surface of the fuel swirler, the fuel swirler being configured to impart a swirling motion to fuel flowing through the primary circuit.

In another aspect, embodiments of the invention provide a method of making a multiphase fuel injector. The method includes the step of using additive manufacturing to construct an injector body, wherein using additive manufacturing to construct the injector body comprises constructing the injector body to include a fuel inlet at a first end of the injector body and a fuel outlet at a second end of the injector body opposite the first end. The injector body further includes a primary circuit disposed within the injector body proximate the fuel inlet, and extending into a central portion of the injector body. The primary circuit has one or more helical primary openings formed in the injector body. The one or more helical primary openings are configured to direct a first flow of pressurized fuel to a spin chamber and to impart a swirling motion to the first flow of pressurized fuel. The injector body also includes a secondary circuit located within the injector body and positioned radially outward from the primary circuit. The secondary circuit has one or more helical secondary openings formed in the injector body. The one or more helical secondary openings are configured to direct a second flow of pressurized fuel toward a fuel outlet and to impart a swirling action to the second flow of pressurized fuel.

In a particular embodiment, the method also includes inserting a flow plate and spring into an opening within the injector. The flow plate abuts the biasing spring, wherein the flow plate blocks fuel from flowing into the secondary circuit when the biasing spring is fully extended, and allows fuel to flow into the secondary circuit when the biasing spring is compressed.

In yet another aspect, embodiments of the invention provide a method of making a multiphase fuel injector. The method includes the step of using additive manufacturing to construct an injector body, wherein using additive manufacturing to construct the injector body comprises constructing the injector body to include a fuel inlet at a first end of the injector body and a fuel outlet at a second end of the injector body opposite the first end. A primary circuit is disposed within the injector body proximate the fuel inlet, and extends into a central portion of the injector body. The primary circuit has a fuel swirler disposed in an opening within the injector body. The fuel swirler is configured to direct a first flow of pressurized fuel to a spin chamber and to impart a swirling motion to the first flow of pressurized fuel. A secondary circuit is located within the injector body and positioned radially outward from the primary circuit. The secondary circuit has one or more helical secondary openings formed in the injector body. The one or more helical secondary openings are configured to direct a second flow of pressurized fuel toward a fuel outlet and to impart a swirling action to the second flow of pressurized fuel.

In a particular embodiment, the fuel swirler is cylindrical with helical grooves formed in an exterior surface of the fuel swirler.

Embodiments of the invention provide an improvement to the state of the art with respect to fuel injectors. These and other advantages of the invention, as well as additional inventive features, will be apparent from the description of the invention provided herein.

BRIEF SUMMARY OF THE INVENTION

In one aspect, embodiments of the invention provide a multiphase or dual-circuit fuel injector, in which primary and secondary circuits are separated at the tip of the injector. Embodiments of the multiphase or dual-circuit fuel injector include a single fuel inlet, where the primary circuit provides better atomization for reliable light-off, and a quickly opening secondary circuit (resulting in a higher flow number (FN)) allows for the engine to go to maximum power very quickly. The multiphase fuel injector also eliminates the moving components (e.g., the pintle) and both manufacturing and operational complexity which may be present in some conventional variable-area fuel injectors (VAFI).

In particular embodiments, atomization quality during light-off and fuel flow transition from light-off condition to max power quickly is improved in comparison to conventional fuel injectors. Limited or non-moving components located inside the fuel nozzle help to maintain a consistent transition for improved performance.

In another aspect, embodiments of the invention provide a multiphase fuel injector that includes an injector body having an opening at a first end of the injector body. The opening defines a fuel inlet. A primary circuit is disposed proximate the opening in a central portion of the injector body. The primary circuit is configured to receive a flow of pressurized fuel from the fuel inlet and discharge the fuel toward a central portion of a spin chamber located in the injector body downstream from the fuel inlet. The primary circuit is configured to create a swirling action in the flow of pressurized fuel. A secondary circuit is located in the injector body radially outward from the primary circuit proximate an inner wall of the injector body. The secondary circuit is configured to receive a flow of pressurized fuel from the fuel inlet and discharge the fuel toward a perimeter portion of the spin chamber. The secondary circuit is configured to create a swirling action in the flow of pressurized fuel.

As used in this application, the term "axially" refers to distances traversed in a direction from one end of the fuel injector to the opposite end, e.g., from the fuel inlet to the fuel outlet, where, in some embodiments, a longitudinal axis of the fuel injector runs through the center of the cylindrical injector from one end to the opposite end. As used in this application, the term "radially" refers to directions and distances perpendicular to the longitudinal axis, e.g., from the longitudinal axis to a wall of the cylindrical injector and beyond.

In a particular embodiment of the invention, the primary circuit includes a flow plate attached to a biasing spring, wherein the flow plate blocks fuel from flowing into the secondary circuit when the biasing spring is fully extended, and allows fuel to flow into the secondary circuit when the biasing spring is compressed.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Current pintle-style variable-area fuel injectors (VAFI) tend to be relatively complex and expensive devices. It is desired that these types of fuel injectors have a high degree of fuel atomization for light-off, and the ability to quickly go to maximum power (i.e., to increase fuel flow quickly) for missile applications. It is challenging to meet both requirements using a single-orifice fuel injector just simply due to the orifice curve. To meet higher flow requirements, it is advantageous for the injector to have a large orifice diameter, but this tends to produce poor spray quality which affects light-off performance.

Figure 1:
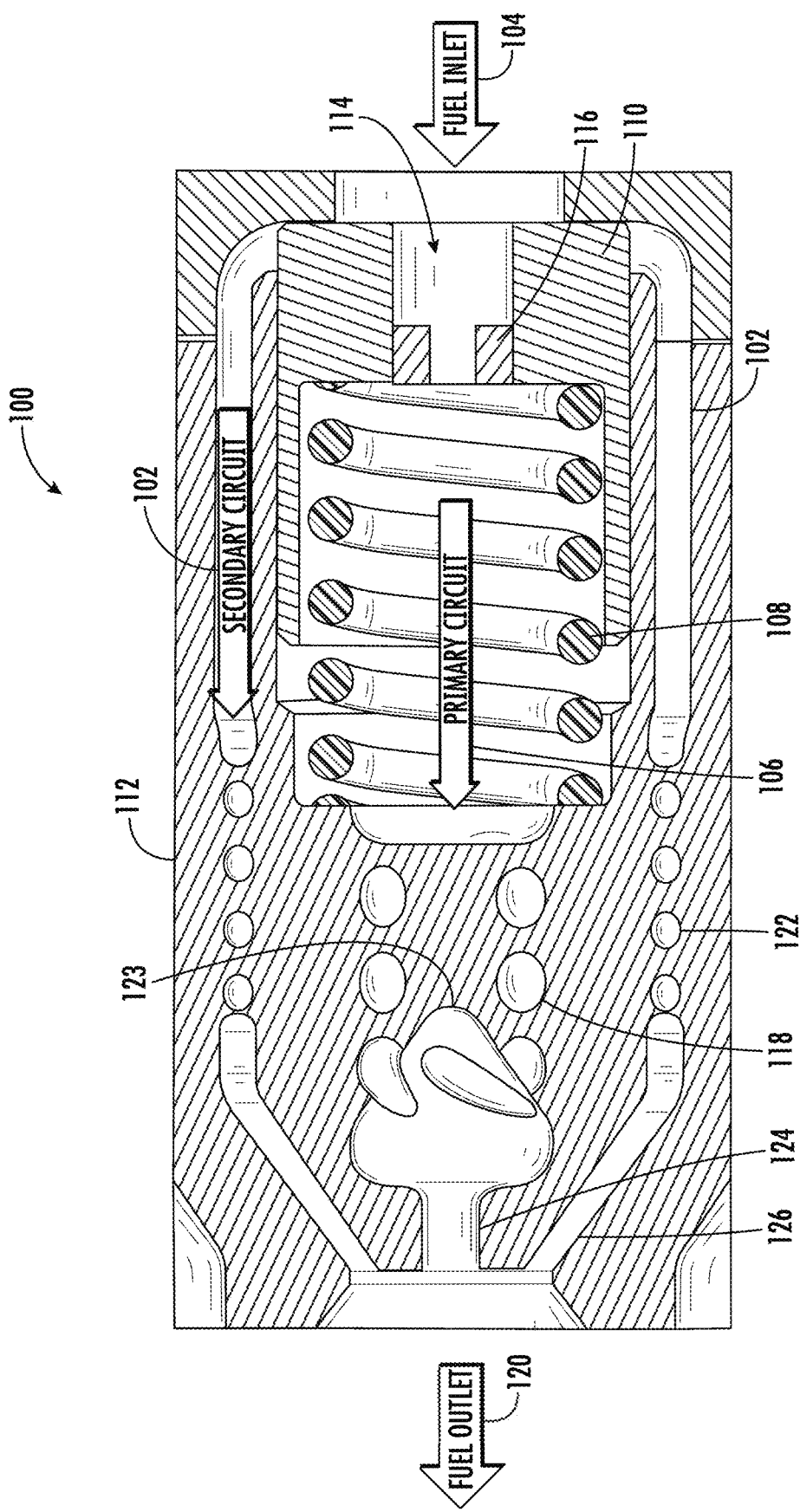
FIG. 1 is a cross-sectional view of a multiphase fuel injector, constructed in accordance with an embodiment of the invention.
Figure 2:
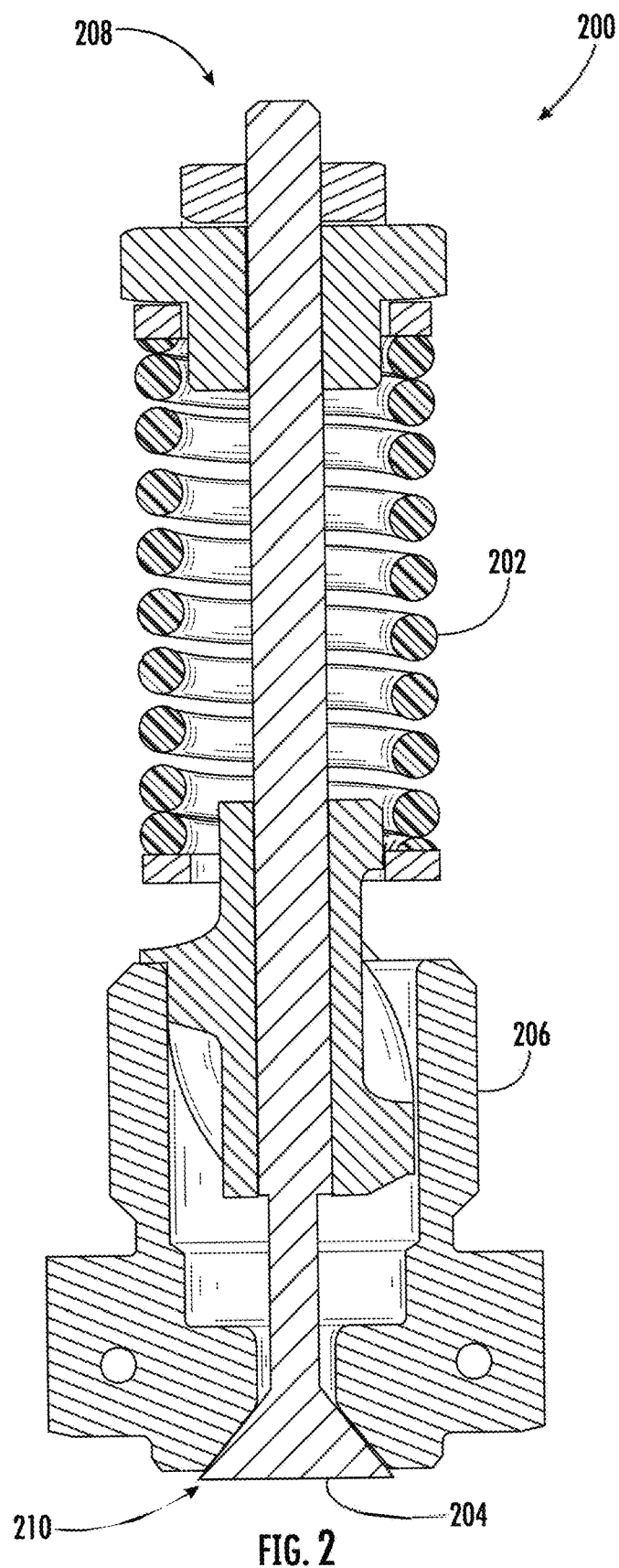
FIG. 2 is a cross-sectional view of conventional fuel injector.

FIG. 1 is a cross-section view of a multiphase fuel injector 100, constructed in accordance with an embodiment of the invention. In certain embodiments, the multiphase fuel injector 100 shown in FIG. 1 and on the far right of FIG. 2 provide a low cost, additively manufactured fuel injector 100 with fewer moving components, improved accuracy, with a reliable approach to regulating the large flow turn-down ratios necessary throughout the required performance envelope. Embodiments of the multiphase fuel injector 100 are able to generate recirculation using a swirling component of the secondary circuit 102 when the fuel changes phase from liquid to gas.

FIG. 2 is a cross-sectional view of conventional fuel injector 200. This conventional fuel injector 200 is a variable area fuel injector that requires a high-accuracy spring 202, a pintle 204, and a nozzle body 206. As the fuel pressure flowing into an inlet end 208 increases, the pintle 204 moves downstream and opens the active area of the fuel injector orifice 210 to increase the flow number or essentially increase fuel flow. A complex balance is required for orifice size selection to meet both ends (i.e., high fuel flow rate and a high degree of atomization) of the performance envelope.

Embodiments of the present invention eliminate the need for a high-accuracy spring 202 (metering type) and for the moving pintle 204. As such, the multiphase fuel injector 100 of FIG. 1 improves on some of the above-described shortcomings of the conventional fuel injector 200. In FIG. 1, the multiphase fuel injector 100 has a single fuel inlet 104 that extends close to a tip area and splits into a primary circuit 106 and the secondary circuit 102 using a simple spring 108. Within a body 112 of the multiphase fuel injector 100 and just downstream of the opening in the injector 100 that defines the fuel inlet 104, there is a larger opening in the injector body 112 that accommodates a flow plate 110 and the simple spring 108, which are described in more detail below. The primary circuit 106 could be sized very small to provide a higher degree of atomization for reliable light-off. At certain pressures, the secondary circuit 102 will open such that the multiphase fuel injector 100 operates as a fixed orifice curve fuel injector. In certain embodiments, the secondary circuit 102 is sized to provide an extremely high flow rate, and to provide a swirling component in the fuel flow for engine combustion operability.

In the embodiment of FIG. 1, the flow plate 110 is positioned within the body 112 of the multiphase fuel injector 100 adjacent to the fuel inlet 104. The flow plate 110 may be cylindrical or piston-shaped with a central opening 114 positioned at the fuel inlet 104, such that fuel flows first through the fuel inlet 104, then through the central opening 114 and downstream into a central portion of the injector body 112. Downstream from the central opening 114, the flow plate 110 has a larger opening inside of which the spring 108 is seated. This larger opening extends to the end of the flow plate 110 opposite the end with the central opening 114. Thus, this largely hollow, open end of the flow plate 110 houses at least some portion of the spring 108 and constitutes a part of the primary circuit 106 leading to the helical or spiraling openings used to impart a swirling motion to the fuel flowing in the primary circuit 106. The spring 108 may be attached to the flow plate 110, or may just abut the flow plate 110 without any attachment. In the embodiment shown, the spring 108 is disposed in a portion of the multiphase fuel injector 100 that extends from the fuel inlet 104 about halfway towards the middle of the injector body 112. When the spring 108 is fully extended, the flow plate 110 abuts an interior end of the injector body 112 adjacent to the fuel inlet 104.

A trim orifice 116 may be placed within, and attached to, an interior surface of the central opening 114. The trim orifice 116 reduces the diameter of the central opening 114 in order to regulate the amount of fuel that can enter into the injector body 112. Depending on the particular application, trim orifices 116 of varying sized can be placed within the central opening 114 to ensure the correct amount of fuel is output from the multiphase fuel injector 100. Fuel entering the injector body 112 via the central opening 114 then flows through the primary circuit 106, which may include one or more helical or spiraling primary openings 118 in the injector body 112 in order to introduce a swirling motion to the fuel flowing out of the primary circuit 106 and into a spin chamber 123. As a result of the one or more helical or spiraling primary openings 118 in the injector body 112, a swirling flow of pressurized fuel flows out of the primary openings 118, into the spin chamber 123, through primary outlet port 124, and then to the fuel outlet 120.

When the pressure of the fuel entering the inlet 104 is sufficiently high, the fuel flow acts on the flow plate 110 to compress the spring 108. As the fuel flow pressure increases, the flow plate 110 moves downstream into the central portion of the injector body 112. As the flow plate 110 moves downstream, the inlet to the secondary circuit 102 opens and fuel is able to flow into the secondary circuit 102. In the embodiment shown, the secondary circuit 102 has one or more openings that extends radially outward from the inlet of the secondary circuit 102, subsequently extending both axially and linearly along a radially-outward section of the injector body 112. These one or more axially- and linearly-extending openings transition to one or more helical or spiraling secondary openings 122 in the injector body 112 in order to introduce a swirling motion to the fuel flowing out of the secondary circuit 102. The one or more spiraling secondary openings 122 of the secondary circuit 102 are located radially-outward from the one or more spiraling primary openings 118 of the primary circuit 106. The swirling flow of pressurized fuel then flows out of the one or more spiraling secondary openings 122 through a secondary outlet port 126, and then to the fuel outlet 120.

The injector body 112, including the features of the primary circuit 106 and the secondary circuit 102, may be manufactured using additive manufacturing, also referred to as 3-D printing. Additive manufacturing facilitates the inclusion of spiraling primary openings 118 and spiraling secondary openings 122 in the injector body 112. As can be seen in the cross-sectional view of FIG. 1, the spiraling primary openings 118 and spiraling secondary openings 122 are shown as a plurality of openings in the solid material of the injector body 112.

In embodiments of the invention, the multiphase fuel injector 100 provides high accuracy, high turndown ratios, reliable transition. While conventional variable area fuel injectors typically have fuel turndown ratios of about 25, the multiphase fuel injector 100 has a typical fuel turndown ratio of 150, or possibly more. Further, the maximum fuel flow for the multiphase fuel injector 100 is generally two to three times the maximum flow for a conventional variable area fuel injector. Some features of the multiphase fuel injector 100 include, but are not limited to, very low fuel mass flow rate at start condition; high turndown flow ratio (e.g., 3-4 times higher than conventional variable-area fuel injectors (VAFI)); passive system with no moving parts; elimination of flow shift and pintle failures; and additional swirling component in the secondary circuit. While the ratio of fuel flow rate to the square root of the differential pressure, known as the flow number (FN), for a conventional variable-area fuel injector typically ranges from 10 to 70, the FN for the multiphase fuel injector ranges from 5 to 250, proving a larger turndown ratio.

Figure 3:
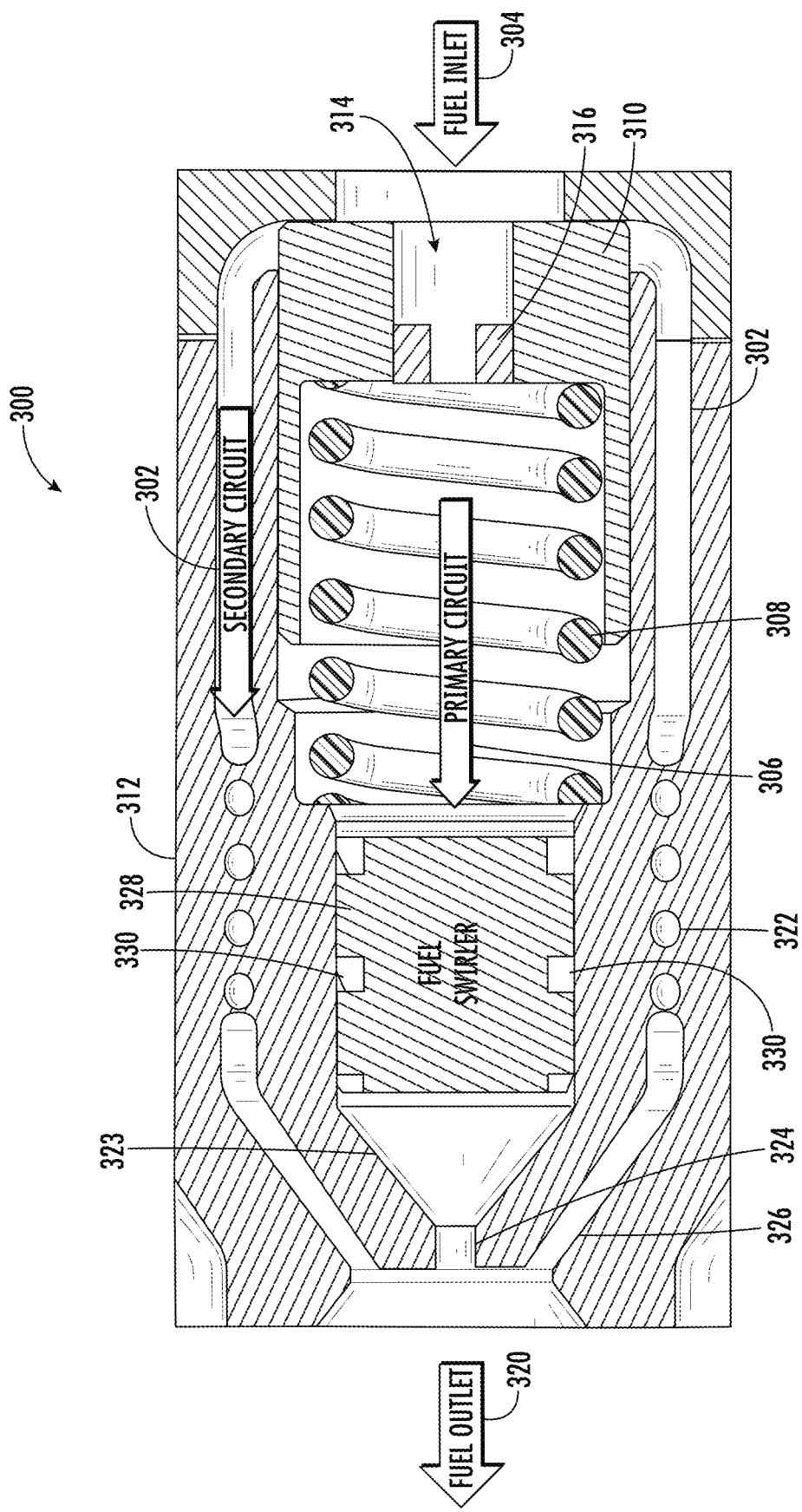
FIG. 3 is a cross-sectional view of an alternate embodiment of the multiphase fuel injector, constructed in accordance with an embodiment of the invention.

FIG. 3 is a cross-sectional view of an alternate embodiment of the multiphase fuel injector 300, constructed in accordance with an embodiment of the invention. Similar to the injector 100 shown in FIG. 1, the multiphase fuel injector 300 of FIG. 3 has a single fuel inlet 304 that extends close to a tip area and splits into a primary circuit 306 and the secondary circuit 302 using a simple spring 308. The primary circuit 306 could be sized very small to provide a higher degree of atomization for reliable light-off. At certain pressures, the secondary circuit 302 will open such that the multiphase fuel injector 300 operates as a fixed orifice curve fuel injector. In certain embodiments, the secondary circuit 302 is sized to provide an extremely high flow rate, and to provide a swirling component in the fuel flow for engine combustion operability.

Also, similar to the embodiment of FIG. 1, multiphase fuel injector 300 has a flow plate 310 is positioned within a body 312 of the multiphase fuel injector 300 adjacent to the fuel inlet 304. The flow plate 310 may be cylindrical or piston-shaped with a central opening 314, positioned at the fuel inlet 304, through which fuel flows into the injector body 312. At the end of the flow plate 310 opposite the end with the central opening 314, the flow plate 310 has a largely hollow open end which accommodates the spring 308. In the embodiment shown, the spring 308 is disposed in a portion of the multiphase fuel injector 300 that extends from the fuel inlet 304 about halfway towards the middle of the injector body 312. When the spring 308 is fully extended, the flow plate 310 abuts an interior end of the injector body 312 adjacent to the fuel inlet 304.

A trim orifice 316 may be placed within, and attached to, an interior surface of the central opening 314. The trim orifice 316 functions in the same way as trim orifice 116 described hereinabove. As in the embodiment described above, when the pressure of the fuel entering the inlet 304 is sufficiently high, the fuel flow acts on the flow plate 310 to compress the spring 308. As the flow plate 310 moves into the injector body 312, fuel is able to flow into the secondary circuit 302. In the embodiment shown, the secondary circuit 302 includes one or more helical or spiraling secondary openings 322 in the injector body 312 in order to introduce a swirling motion to the fuel flow. Both the primary and secondary circuits 306, 302 introduce a swirling motion to the fuel flowing through the circuits 306, 302. The swirling fuel then flows out of the primary and secondary circuits 306, 302 to the injector outlet 320 via a primary outlet port 324 and secondary outlet port 326, respectively. Fuel flow from the primary circuit 306 passes through a spin chamber 323 before reaching the injector outlet 320.

However, the multiphase fuel injector 300 differs from the embodiment of FIG. 1 in that multiphase fuel injector 300 does not include one or more spiraling primary openings 118 formed in the injector body 312 using additive manufacturing. Instead, in certain embodiments of the invention, the multiphase fuel injector 300 has an opening in the injector body 312 for the insertion of a fuel swirler 328 with helical grooves 330 machined, formed, or molded into an outer surface of the fuel swirler 328. In particular embodiments, the fuel swirler 328 is cylindrical and the helical grooves 330 extend around the sidewalls of the cylinder from an inlet end of the fuel swirler 328 to an outlet end. In the embodiment of FIG. 3, the one or more spiraling secondary openings 322 of the secondary circuit 302 are located radially-outward from the fuel swirler 328.

It is envisioned that, with the embodiment shown in FIG. 3, different fuel swirlers 328, with different characteristics, could be used in the multiphase fuel injector 300 depending on the particular application. Use of a machined or molded, drop-in fuel swirler 328 allows for potentially faster, less expensive manufacturing, and more flexibility in the application of the multiphase fuel injector 300.

Figure 4:
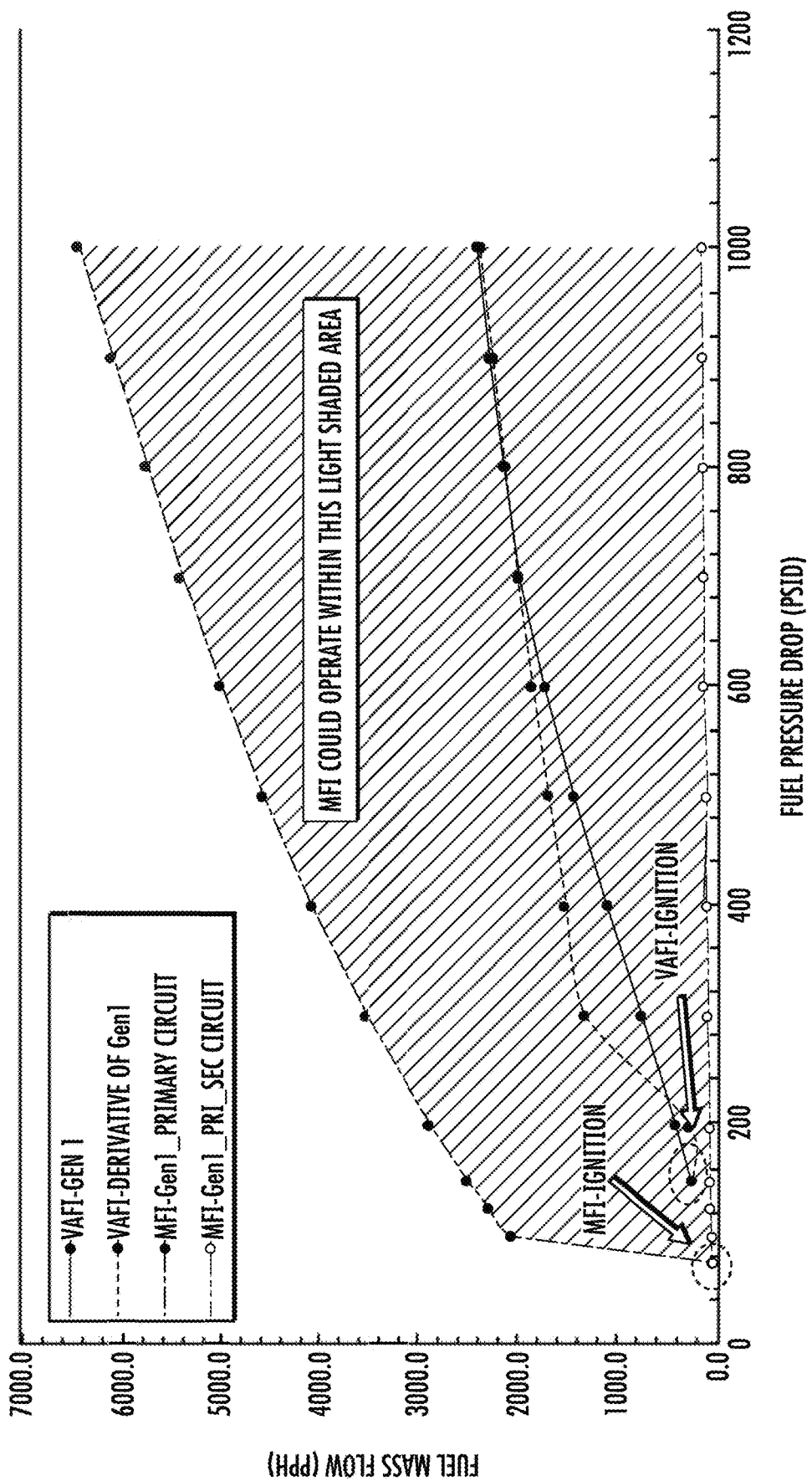
FIG. 4 is a graphical illustration showing the relationship between fuel mass flow and fuel pressure drop for both conventional variable area fuel injectors and the multiphase fuel injector.

FIG. 4 is a graphical illustration showing the relationship between fuel mass flow and fuel pressure drop for both conventional variable area fuel injectors and the multiphase fuel injector 100, 300. As can be seen from FIG. 4, the multiphase fuel injector 100, 300 has a much wider range of operational capability as compared to conventional variable area fuel injectors. The multiphase fuel injector 100, 300 can operate at very low fuel mass flow rates when using only the primary circuit 106, 306, and at very high fuel mass flow rates when using both the primary and secondary circuits 106, 102, 306, 302.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of making a multiphase fuel injector, the method comprising the steps of:
   additively manufacturing an injector body, wherein the injector body includes:
   a fuel inlet at a first end of the injector body and a fuel outlet at a second end of the injector body opposite the first end;
   a primary circuit disposed within the injector body proximate the fuel inlet and extending into a central portion of the injector body, the primary circuit having a fuel swirler disposed in an opening within the injector body, the fuel swirler configured to receive a first flow of pressurized fuel from the fuel inlet, direct the first flow of pressurized fuel to a spin chamber located in the injector body downstream from the fuel inlet, and impart a swirling motion to the first flow of pressurized fuel; and
   a secondary circuit located within the injector body and positioned radially outward from the primary circuit, the secondary circuit configured to receive a second flow of pressurized fuel from the fuel inlet, the secondary circuit having one or more helical secondary openings formed in the injector body, the one or more helical secondary openings configured to direct the second flow of pressurized fuel toward the fuel outlet and to impart a swirling motion to the second flow of pressurized fuel,
   wherein the primary circuit includes a flow plate attached to a biasing spring, wherein the flow plate blocks fuel from flowing into the secondary circuit when the biasing spring is fully extended, and allows fuel to flow into the secondary circuit when the biasing spring is compressed.

2. The method of claim 1, wherein the fuel swirler is cylindrical with helical grooves formed in an exterior surface of the fuel swirler.

3. A method of making a multiphase fuel injector, the method comprising the steps of:
   additively manufacturing an injector body, wherein the injector body includes:
   a fuel inlet at a first end of the injector body and a fuel outlet at a second end of the injector body opposite the first end;
   a primary circuit disposed within the injector body proximate the fuel inlet and extending into a central portion of the injector body, the primary circuit configured to receive a first flow of pressurized fuel from the fuel inlet, the primary circuit having one or more helical primary openings formed in the injector body, the one or more helical primary openings configured to direct the first flow of pressurized fuel to a spin chamber located in the injector body downstream from the fuel inlet, the one or more helical primary openings further configured to impart a swirling motion to the first flow of pressurized fuel; and
   a secondary circuit located within the injector body and positioned radially outward from the primary circuit, the secondary circuit configured to receive a second flow of pressurized fuel from the fuel inlet, the secondary circuit having one or more helical secondary openings formed in the injector body, the one or more helical secondary openings configured to direct the second flow of pressurized fuel toward the fuel outlet and to impart a swirling motion to the second flow of pressurized fuel,
   wherein the primary circuit includes a flow plate attached to a biasing spring, wherein the flow plate blocks fuel from flowing into the secondary circuit when the biasing spring is fully extended, and allows fuel to flow into the secondary circuit when the biasing spring is compressed.

4. The method of claim 3, wherein the flow plate and spring are inserted into an opening within the injector.

5. A multiphase fuel injector, comprising:
   an injector body having a fuel inlet at a first end of the injector body and a fuel outlet at a second end of the injector body opposite the first end;
   a primary circuit disposed proximate the fuel inlet and extending into a central portion of the injector body, the primary circuit configured to receive a first flow of pressurized fuel from the fuel inlet and discharge the fuel into a spin chamber located in the injector body downstream from the fuel inlet, the primary circuit configured to impart a swirling motion to the first flow of pressurized fuel;
   a secondary circuit located in the injector body radially outward from the primary circuit, the secondary circuit configured to receive a second flow of pressurized fuel from the fuel inlet and discharge the fuel into the fuel outlet, the secondary circuit configured to impart a swirling motion to the second flow of pressurized fuel,
   wherein the primary circuit includes a flow plate attached to a biasing spring, wherein the flow plate blocks fuel from flowing into the secondary circuit when the biasing spring is fully extended, and allows fuel to flow into the secondary circuit when the biasing spring is compressed.

6. The multiphase fuel injector of claim 5, wherein the biasing spring, flow plate, and primary circuit are configured to facilitate ignition of fuel at a flow rate of less than 50 pounds per hour (PPH).

7. The multiphase fuel injector of claim 5, wherein the biasing spring, flow plate, primary circuit, and secondary circuit are together configured to facilitate a maximum fuel flow rate greater than 6,000 pounds per hour (PPH).

8. The multiphase fuel injector of claim 5, wherein the primary circuit includes one or more helical primary openings formed in the injector body, the one or more helical primary openings configured to direct the first flow of pressurized fuel in the primary circuit to the spin chamber and to impart the swirling motion to the first flow of pressurized fuel.

9. The multiphase fuel injector of claim 8, wherein the secondary circuit includes one or more helical secondary openings formed in the injector body, the one or more helical secondary openings configured to direct the second flow of pressurized fuel to the fuel outlet and to impart the swirling motion to the second flow of pressurized fuel.

10. The multiphase fuel injector of claim 9, wherein the one or more helical secondary openings are located radially outward from the one or more helical primary openings.

11. The multiphase fuel injector of claim 5, wherein the primary circuit includes a fuel swirler inserted into an opening in the injector body, the fuel swirler having one or more helical grooves in an exterior surface of the fuel swirler, the fuel swirler being configured to impart the swirling motion to fuel flowing through the primary circuit.

* * * * *